US012700390B2

(12) United States Patent
Miwa et al.

(10) Patent No.: US 12,700,390 B2
(45) Date of Patent: Aug. 4, 2026

(54) SYSTEMS AND METHODS FOR DIRECTING FLEXURAL WAVES

(71) Applicants: Toyota Motor Engineering & Manufacturing North America Inc, Plano, TX (US); Toyota Jidosha Kabushiki Kaisha, Toyota (JP)

(72) Inventors: Tomohiro Miwa, Toyota (JP); Miki Nakahara, Toyota (JP); Xiaoshi Su, Ann Arbor, MI (US); Debasish Banerjee, Ann Arbor, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 225 days.

(21) Appl. No.: 18/468,815

(22) Filed: Sep. 18, 2023

(65) Prior Publication Data

US 2025/0091087 A1 Mar. 20, 2025

(51) Int. Cl.
*G10K 11/172* (2006.01)

(52) U.S. Cl.
CPC .................................. *G10K 11/172* (2013.01)

(58) Field of Classification Search
CPC .................................................... G10K 11/172
USPC .......................................................... 181/208
See application file for complete search history.

(56) References Cited

U.S. PATENT DOCUMENTS 2,541,159 A * 2/1951 Geiger ...................... E04B 1/84 181/208
3,087,567 A * 4/1963 Kurtze ................. G10K 11/172 181/208
4,373,608 A * 2/1983 Holmes ..................... F16F 7/10 181/208
4,736,701 A * 4/1988 Kondo ....................... B63B 3/70 114/340
6,478,110 B1 * 11/2002 Eatwell .................. G10K 11/16 181/207
8,025,124 B2 * 9/2011 Levit ....................... F16F 7/108 181/284
11,333,215 B2 * 5/2022 Lammi ................. B64C 27/001
11,524,637 B2 * 12/2022 Chang ................. B60R 13/0884
(Continued)

FOREIGN PATENT DOCUMENTS

JP 2016109283 A 6/2016

OTHER PUBLICATIONS

Carta et al. "One-way interfacial waves in a flexural plate with chiral double resonators." Philosophical Transactions of the Royal Society A 378.2162 (2020): 20190350.
(Continued)

*Primary Examiner* — Jeremy A Luks
(74) *Attorney, Agent, or Firm* — Christopher G. Darrow; Darrow Mustafa PC

(57) ABSTRACT

Disclosed are systems for directing flexural waves acting upon a structure. In one example, a system includes a beam and a pair of scatterers disposed on the beam and configured to induce a flexural wave on the beam when actuated at a frequency. The system is configured to direct a direction of travel of the flexural wave acting on the beam based on the width of the beam, the distance between the scatterers forming the pair of scatterers, and/or a phase difference between the actuation of the pair of scatterers.

9 Claims, 6 Drawing Sheets

(56) References Cited

U.S. PATENT DOCUMENTS

| | | | | |
|---|---|---|---|---|
| 2020/0160830 | A1* | 5/2020 | Lee | G10K 11/20 |
| 2022/0051650 | A1* | 2/2022 | Lee | G10K 11/172 |
| 2022/0112931 | A1* | 4/2022 | Lee | F16F 7/116 |
| 2022/0190231 | A1* | 6/2022 | Li | H10N 30/302 |
| 2022/0214312 | A1* | 7/2022 | Lee | G01N 29/11 |
| 2022/0244221 | A1* | 8/2022 | Li | G06N 3/09 |
| 2022/0285604 | A1* | 9/2022 | Li | H10N 30/304 |
| 2023/0167877 | A1* | 6/2023 | Li | F16F 15/04<br>188/378 |
| 2023/0377546 | A1* | 11/2023 | Su | G10K 11/172 |
| 2023/0419939 | A1* | 12/2023 | Li | G10K 11/36 |
| 2025/0067316 | A1* | 2/2025 | Miwa | F16F 7/108 |
| 2025/0069575 | A1* | 2/2025 | Miwa | G10K 11/172 |

OTHER PUBLICATIONS

Cao et al. "Perfect absorption of flexural waves induced by bound state in the continuum." Extreme Mechanics Letters 47 (2021): 101364.

Chen et al. "A programmable metasurface for real time control of broadband elastic rays." Smart Materials and Structures 27.11 (2018): 115011.

Li et al. "An active meta-layer for optimal flexural wave absorption and cloaking." Mechanical Systems and Signal Processing 149 (2021): 107324.

Cao et al. "Flexural wave absorption by lossy gradient elastic metasurface." Journal of the Mechanics and Physics of Solids 143 (2020): 104052.

* cited by examiner

SYSTEMS AND METHODS FOR DIRECTING FLEXURAL WAVES

TECHNICAL FIELD

The present disclosure generally relates to systems and methods for directing flexural waves.

BACKGROUND

The background description provided is to present the context of the disclosure generally. Work of the inventors, to the extent it may be described in this background section, and aspects of the description that may not otherwise qualify as prior art at the time of filing, are neither expressly nor impliedly admitted as prior art against the present technology.

Flexural waves, sometimes called bending waves, deform the structure transversely as they propagate. Flexural waves are more complicated than compressional or shear waves and depend on material and geometric properties. Airborne noises can be created by flexural waves when an object comes into contact with a structure subjected to a flexural wave. Flexural vibrations of thin structures, such as beams, plates, and shells are the most common noise source caused by flexural waves.

SUMMARY

This section generally summarizes the disclosure and is not a comprehensive disclosure of its full scope or all its features.

In one example, a method for directing flexural waves includes the steps of inducing a flexural wave on a structure by actuating at a frequency a pair of transducers and directing the flexural wave acting on the structure by adjusting a factor. The factors can include the width of the structure, the distance between the transducers forming the pair of transducers, and/or a phase difference between the actuation of the pair of transducers.

In another example, a system includes a beam and a pair of scatterers disposed on the beam and configured to induce a flexural wave on the beam when actuated at a frequency. The system is configured to direct a direction of travel of the flexural wave acting on the beam based on the width of the beam, the distance between the scatterers forming the pair of scatterers, and/or a phase difference between the actuation of the pair of scatterers.

Further areas of applicability and various methods of enhancing the disclosed technology will become apparent from the description provided. The description and specific examples in this summary are intended for illustration only and not to limit the scope of the present disclosure.

BRIEF DESCRIPTION OF THE DRAWINGS

The accompanying drawings, which are incorporated in and constitute a part of the specification, illustrate various systems and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Described are systems and methods for directing flexural waves acting upon a structure. Broadly, a pair of transducers can induce a flexural wave on a structure, such as a beam. Generally, when this occurs, flexural waves are generated and move along the length of the beam in both directions. However, the system and method described herein can direct the direction of travel of the flexural waves by adjusting the width of the structure, the distance between the transducers, and/or a phase difference between the actuation of the pair of transducers. Further still, scatterers may be utilized to improve the directional performance of the system.

Figure 1:
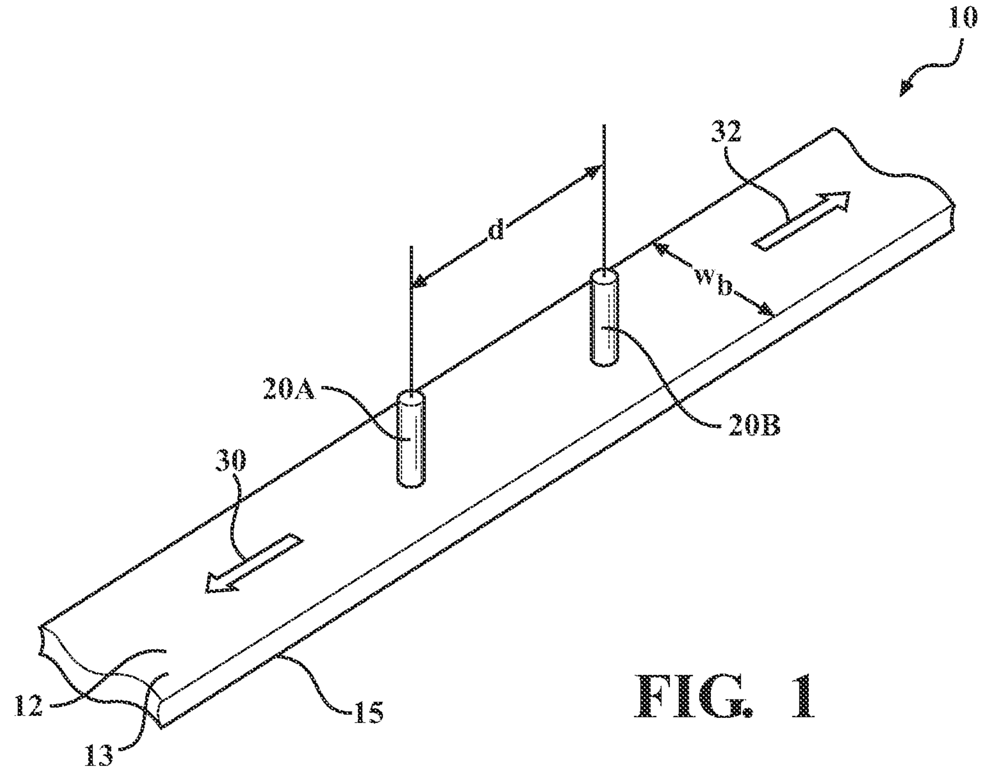
FIG. 1 illustrates one example of a system for directing flexural waves acting upon a structure.

FIG. 1 illustrates one example of a system 10 for directing flexural waves acting upon a structure. In this example, the structure is in the form of a beam 12, having a top side 13 and a bottom side 15. It should be understood that the structure can take any one of a number of different forms and is not limited to beams, such as the beam 12. For example, the structure may be a plate-like structure. The beam 12 may be made of any one of a number of different materials, such as metals, plastics, ceramics, glass fibers, synthetic materials, combinations thereof, and the like.

Located on the top side 13 of the beam 12 are a pair of transducers 20A and 20B that are generally separated away from each other by a distance d along the length of the beam 12. The transducers 20A and 20B can convert one form of energy to another. In this case, the transducers 20A and 20B can convert electrical energy into mechanical energy. When operated appropriately, the transducers 20A and 20B can create a flexural wave that acts upon the beam 12. In another example, the pair of transducers 20A and 20B may be mounted to the bottom side 15 of the beam 12. Further still, it is also possible that one transducer is mounted to the top side 13, while the other transducer is mounted to the bottom side 15. Notably, the separation distance d remains the same regardless of the configuration.

Typically, when the transducers 20A and 20B are operated at a set frequency, causing them to act as shakers, the beam 12 experiences flexural waves caused by the shaking motion of the transducers 20A and 20B. When this occurs, flexural waves are typically radiated in both directions, as indicated by arrows 30 and 32, along the length of the beam 12. As such, flexural waves are radiated to the left of the pair of the transducers 20A and 20B (indicated by the arrow 30) and the right of the pair of transducers 20A and 20B (indicated by the arrow 32).

However, the system 10 can at least partially direct flexural waves produced by the actuation of the pair of the transducers 20A and 20B, such that flexural waves traveling in one direction have greater amplitudes than flexural waves traveling in the other. Broadly, this is accomplished by adjusting one or more factors, such as the width $w_b$ of the beam 12, the distance d between the transducers 20A and 20B, and/or the phase difference between the actuation of the pair of transducers 20A and 20B.

Figure 2:
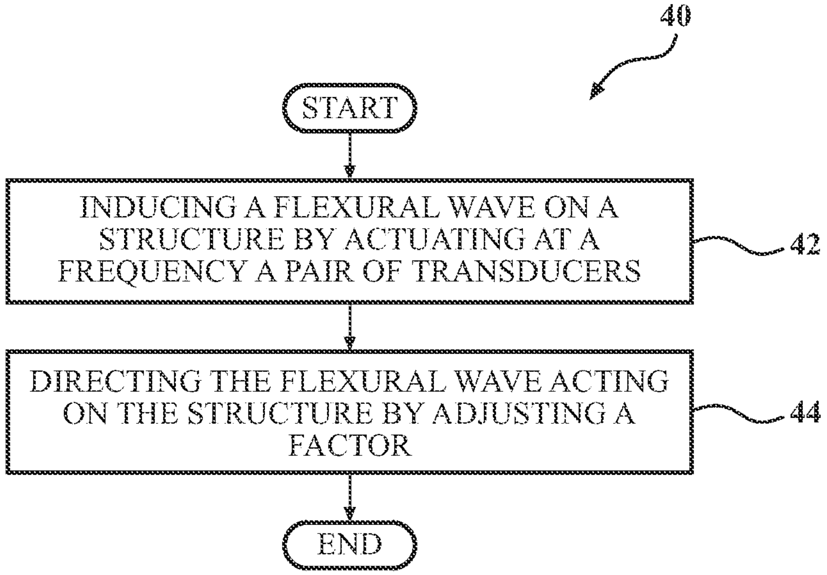
FIG. 2 illustrates one example of a method for directing flexural waves acting upon a structure.

As such, referring to FIG. 2, which illustrates a method 40 for directing flexural waves acting upon a structure, such as the beam 12, the method 40 begins with step 42, wherein a flexural wave is induced on the structure (beam 12) by actuating at a frequency the pair of transducers 20A and 20B. In step 44, the flexural wave acting upon the structure (beam 12) can be directed by adjusting one or more factors, such as the width $w_b$ of the beam 12, the distance d between the transducers 20A and 20B, and/or the phase difference between the actuation of the pair of transducers 20A and 20B.

Figure 3A:
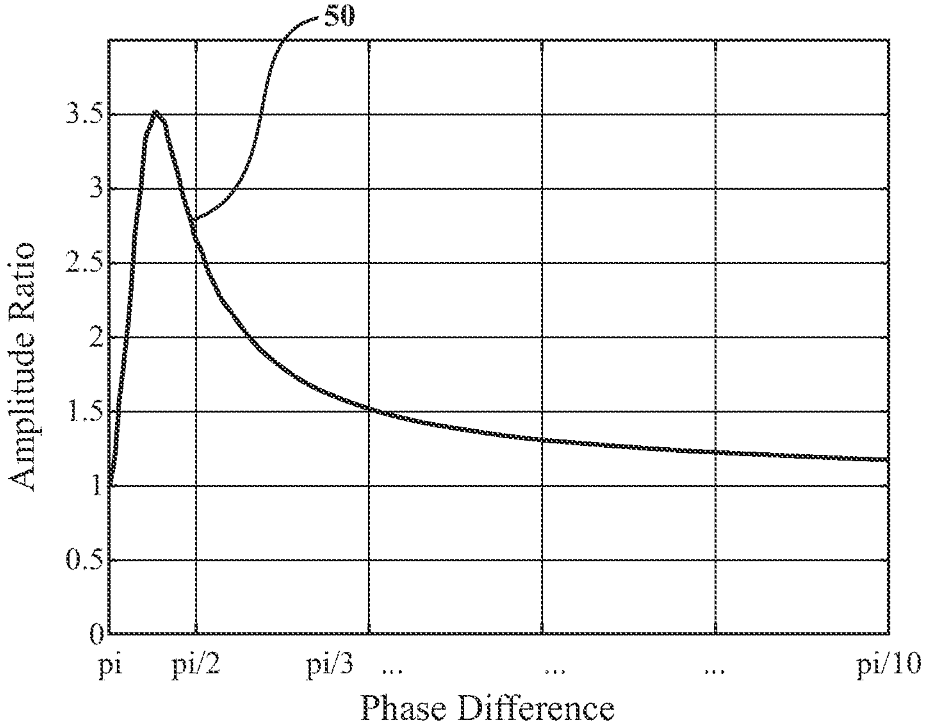
FIGS. 3A and 3B illustrate the results of directing flexural waves acting upon a structure by adjusting one or more factors, such as the width of the structure, the distance between the transducers forming a pair of transducers, and/or a phase difference between the actuation of the pair of transducers.

For example, FIG. 3A illustrates the amplitude ratio 50 of the system 10. The amplitude ratio is defined as the ratio of displacement caused by flexural waves created by the transducers 20A and 20B between a target direction and an opposite direction. For example, the target direction may be to the left, as indicated by the arrow 30, while the opposite direction may be to the right, as indicated by the arrow 32. Here, the distance d between the transducers 20A and 20B is approximately 1.9 cm. In this example, it can be seen that the amplitude ratio can be maximized at 3.5 when the phase difference of the actuation of the transducers 20A and 20B is approximately 2π/3 (120 degrees). As such, the amplitude of the flexural waves traveling in one direction is approximately 3.5 times greater than those traveling in the other.

Figure 3B:
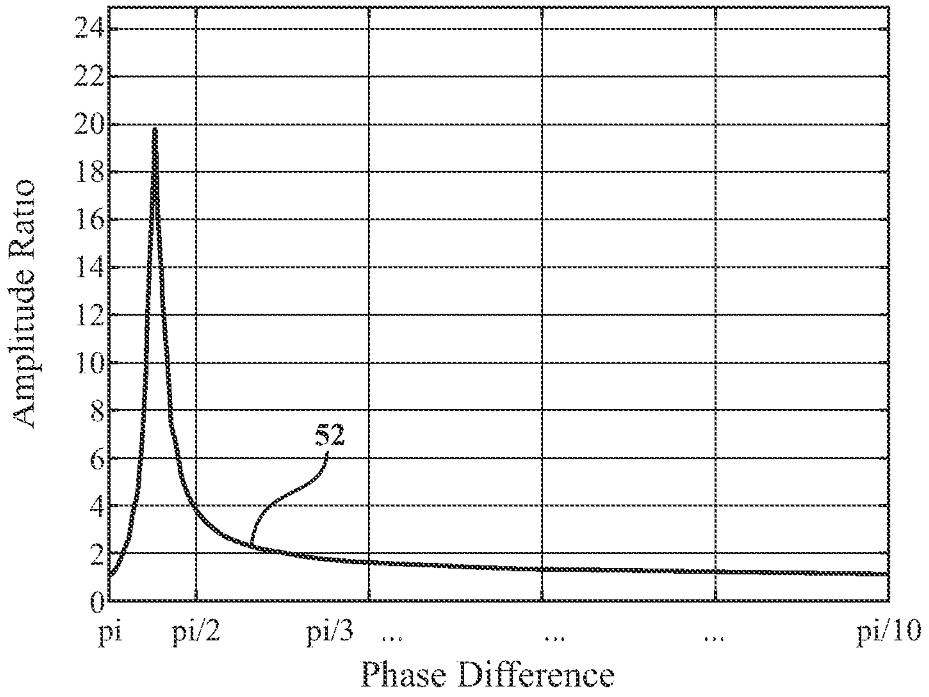

However, as mentioned before, adjusting other factors can also impact the amplitude ratio. For example, FIG. 3B illustrates an amplitude ratio 52 of the system 10, with the difference that the distance d between the transducers 20A and 20B is approximately 3.0 cm. Here, it can be seen that the amplitude ratio 52 is far greater (approximately 20) when the phase difference of the actuation of the transducers 20A and 20B is approximately 2π/3 (120 degrees). As such, by adjusting the factors mentioned previously, such as the width $w_b$ of the beam 12, the distance d between the transducers 20A and 20B, and/or the phase difference between the actuation of the pair of transducers 20A and 20B, the amplitude ratio can be increased/decreased to direct flexural waves acting upon the beam 12 in one direction or the other.

Figure 4:
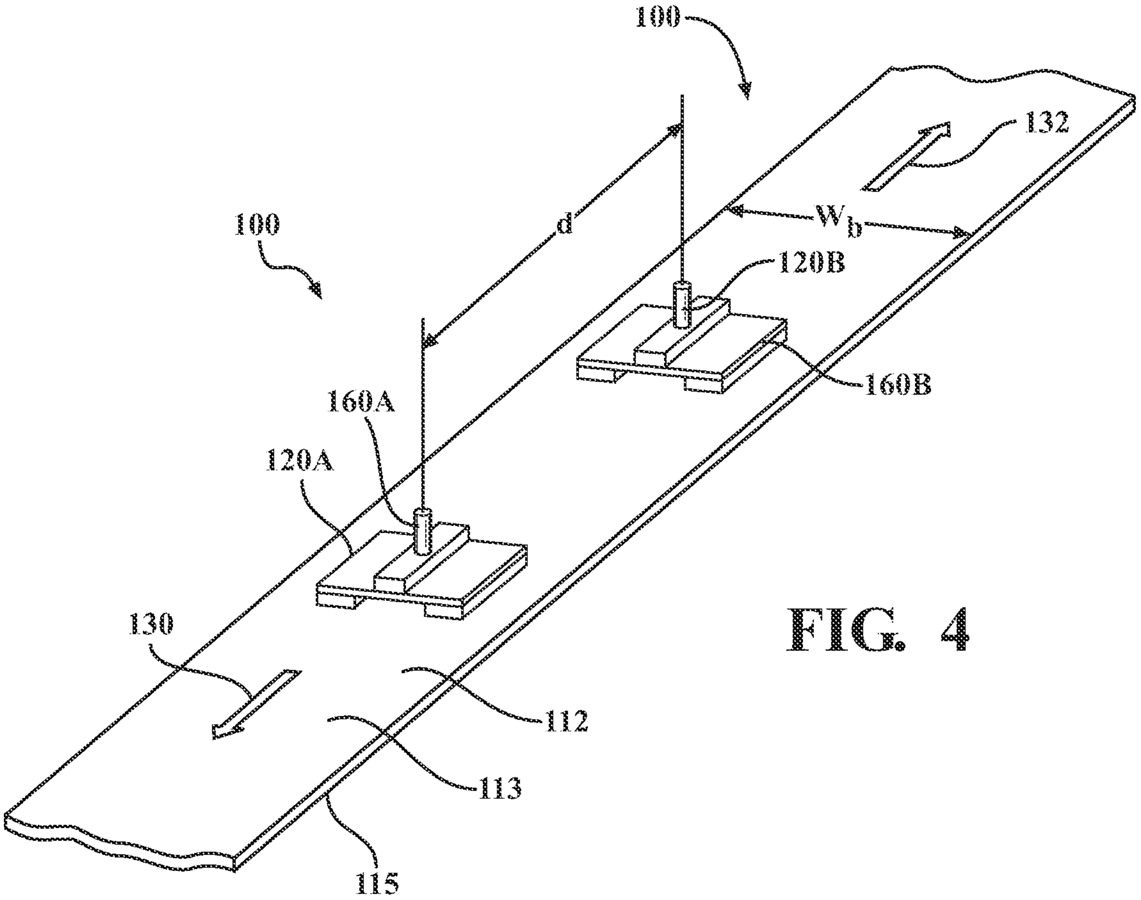
FIG. 4 illustrates a system for directing low-frequency flexural waves acting upon a structure that includes scatterers.

FIG. 4 shows another example of a system 100 for directing flexural waves acting upon a structure. In this example, the structure of the system 100 is a beam 112 having a top side 113 and a bottom side 115. However, like before, the structure can take any of a number of different forms and may instead be a plate-like structure made out of a number of different materials, such as previously described when describing the beam 12 of FIG. 1. Generally, the system 100 of FIG. 4 is particularly well-suited to directing flexural waves at lower frequencies, such as below 1000 Hz.

Here, the system 100 differs from the system 10 of FIG. 1 in that the system 100 also includes a pair of scatterers 160A and 160B that may be actuated by a pair of transducers 120A and 120B. The transducers 120A and 120B may be similar to that of the transducers 20A and 20B of FIG. 1 and may convert electrical energy into mechanical energy, causing a shaking motion that induces a flexural wave to act upon the beam 112 via the scatterers 160A and 160B.

Generally, the scatterers 160A and 160B are mounted to the top side 113 of the beam 112 and are separated by a distance d, which may be approximately one-quarter of the wavelength of the frequency of the flexural wave acting upon the beam 112. However, it should be understood that scatterers 160A and 160B and the transducers 120A and 120B may be mounted to the bottom side 115 of the beam 112. Further still, it may also be possible that one scatterer and associated transducer be mounted to the top side 113, while the other scatterer and associated transducer may be mounted to the bottom side 115. Notably, the separation distance d remains the same regardless of the configuration.

Figure 5:
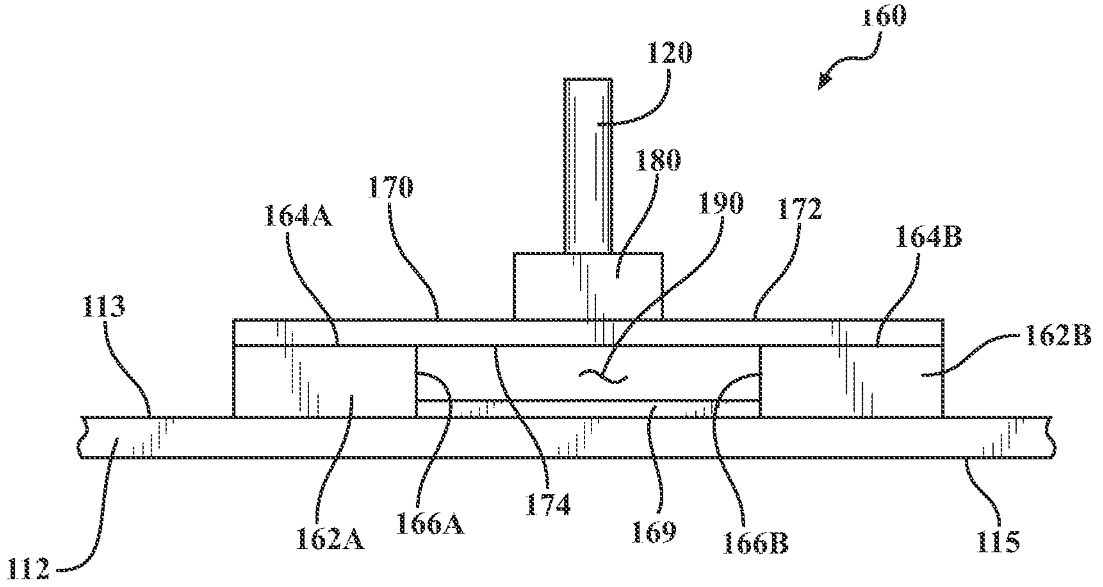
FIG. 5 illustrates a more detailed view of a scatterer utilized in the system of FIG. 4.

A more detailed view of the scatterer 160, which may be similar to the scatterers 160A and 160B, is shown in FIG. 5. In this example, the scatterer 160 includes a pair of supports 162A and 162B. Each of the supports 162A and 162B may be made of a rigid material and be cuboid. However, it should be understood that the supports 162A and 162B may take any one of a number of different forms and be made of different materials that may be less rigid. Furthermore, in this example, the shapes, dimensions, and materials are nearly identical for the supports 162A and 162B. Still, it should also be understood that the shapes, dimensions, and materials may vary between the supports 162A and 162B.

A flexible material 170 with a top side 172 and a bottom side 174 extends between the two supports 162A and 162B. In this example, the bottom side 174 of the flexible material 170 is connected to and extends between the top sides 164A and 164B of the supports 162A and 162B, respectively. However, it should be understood that the flexible material 170 can extend to and from any portion of the supports 162A and 162B, such as the sidewalls 166A and 166B. A cavity 190 is defined between the top side 113 of the beam 112, the bottom side 174 of the flexible material 170, and the sidewalls 166A and 166B of the supports 162A and 162B, respectively.

The flexible material 170 acts as a spring and damper in a mass-spring-damper system and may be made of a flexible material, such as rubber and soft plastics, such as thermoplastic elastomers and/or thermoplastic polyurethane. However, the flexible material 170 may be made of any suitable material that allows the flexible material 170 to act as a spring and damper in a mass-spring-damper system.

A mass 180 is disposed on the top side 172 of the flexible material 170, generally in an area of the flexible material 170 unsupported by the supports 162A and 162B. Due to the flexible nature of the flexible material 170, when the beam 112 experiences vibrations and/or has flexural waves acting upon it, the mass 180 resonates. As such, the mass 180 is the mass in a spring-mass-damper system. Therefore, the resonance of the scatterer 160 is based upon the mass of the mass 180 and the spring/damper characteristics of the flexible material 170. Depending on these variations, the natural resonance of the scatterer 160 can vary considerably. Generally, the natural resonance of the scatterer 160 may be selected based on the frequency of the flexural wave to be directed. As such, the natural resonances of the scatterers 160A and 160B may be substantially similar (within approximately 20%) of the frequency of the flexural wave to be directed in one direction or another (the directions indicated by the arrows 130 and 132).

The scatterer 160 may also include one or more crossbars. In this example, the scatterer 160 includes a crossbar 169 for stabilizing the position of the supports 162A and 162B with respect to each other. The crossbar 169, by stabilizing the position of the supports 162A and 162B with respect to each other, can ensure that the flexible material 170 has the appropriate tension. However, it should be understood that the scatterer 160 does not require a crossbar.

The transducer 120 may be in contact with the mass 180, and when actuated, the transducer 120 may cause the mass 180 to move in an up-and-down motion which causes a flexural wave to act upon the beam 112.

Returning to FIG. 4, when the transducers 120A and 120B cause the masses of the scatterers 160A and 160B to move in an up-and-down motion, flexural waves are created that act upon the beam 112. Generally, when the transducers 120A and 120B are shaking the masses of the scatterers 160A and 160B at the same frequency with no phase difference, flexural waves are radiated in opposite directions, indicated by the arrows 130 and 132. However, when the scatterers 160A and 160B are separated from each other by the distance d being defined, in this example, as one-quarter of the wavelength of the frequency of the flexural waves acting upon the beam 112 and the transducers 120A and 120B are shaking the masses of the scatterers 160A and 160B at the same frequency with a phase difference of +/−90 degrees, flexural waves can be substantially directed in one direction or the other.

Figure 6:
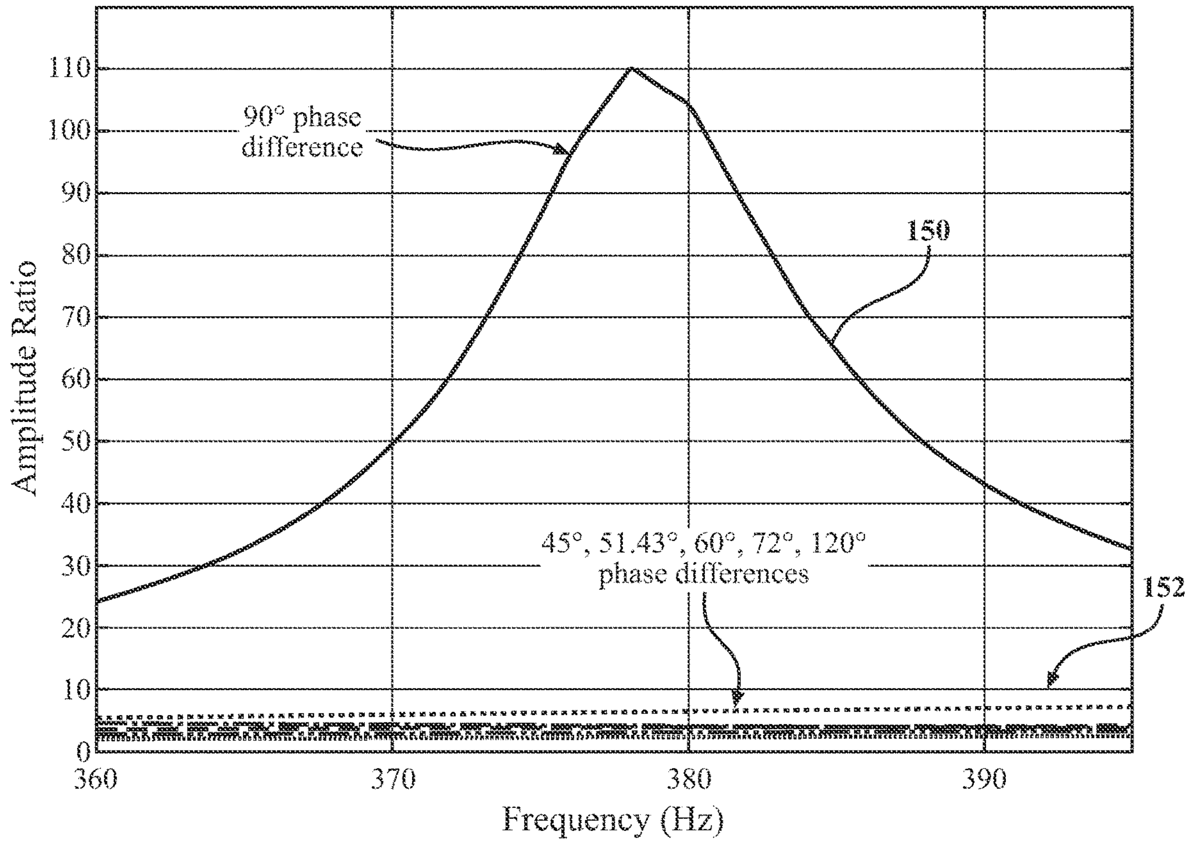
FIG. 6 illustrates the results of directing flexural waves utilizing the system of FIG. 4.

For example, FIG. 6 illustrates the amplitude ratio 150 of the system 100 of FIG. 4 when there is a 90 degrees phase difference between the actuation of the scatterers 160A and 160B. In this example, the beam 112 has a width $w_b$ of 10.16 cm and a thickness of approximately 0.8 mm. In some cases, the width $w_b$ may be $$\frac{1}{\sqrt{2}}$$

of the wavelength of the flexural wave acting on the beam 112. The frequency of the flexural wave acting upon the beam 112 is approximately 378 Hz. Here, the amplitude ratio 150 peaks at approximately a 90 degrees phase difference. The amplitude ratios of other phase differences, such as 45 degrees, 51.43 degrees, 60 degrees, 72 degrees, and 120 degrees are shown by the amplitude ratios 152, which are significantly lower than the amplitude ratio 150.

As such, flexural waves can be directed in one direction or the other by adjusting the phase difference of the actuation of the scatterers 160A and 160B by +/−90 degrees. Therefore, if the phase difference is +90 degrees, the amplitude of the flexural waves may be significantly higher in the direction indicated by the arrow 130 and lower in the direction indicated by the arrow 132. Conversely, if the phase difference is −90 degrees, the amplitude of the flexural waves may be significantly higher in the direction indicated by the arrow 132 and lower in the direction indicated by the arrow 130.

Figure 7:
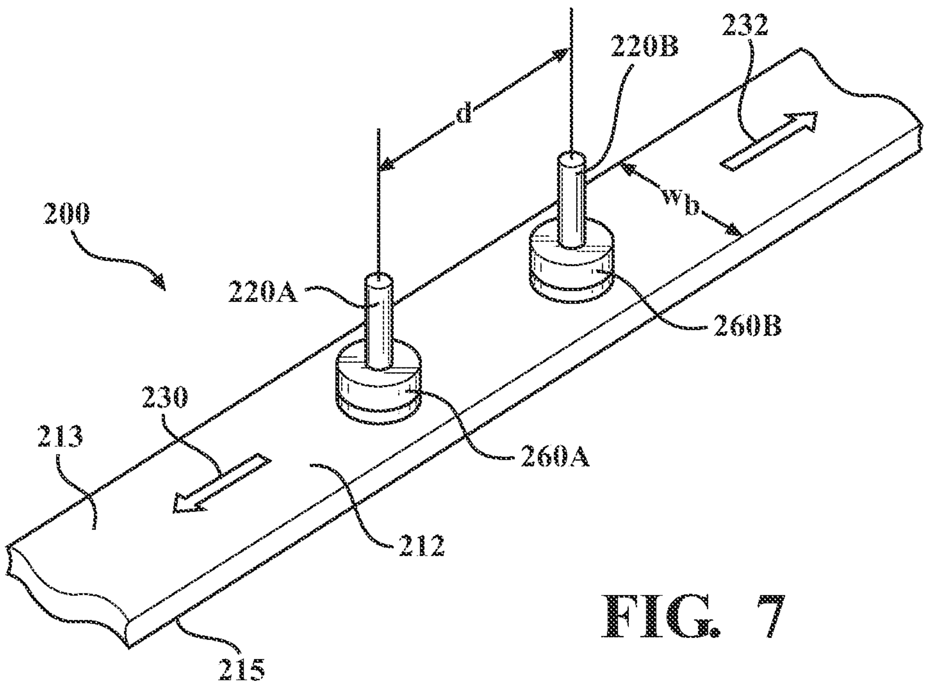
FIG. 7 illustrates a system for directing high-frequency flexural waves acting upon a structure that includes scatterers.

FIG. 7 illustrates another example of a system 200 for directing flexural waves acting upon a structure. Generally, the system 200 of FIG. 7 is particularly well-suited to directing flexural waves at higher frequencies, such as above 1000 Hz. In this example, the structure of the system 200 is a beam 212, having a top side 213 and a bottom side 215. However, like before, the structure can take any of a number of different forms and may instead be a plate-like structure made out of a number of different materials, such as previously described when describing the beam 12 of FIG. 1.

Here, the system 200 is somewhat similar to the system 100 of FIG. 4 in that the system 200 includes a pair of scatterers 260A and 260B that may be actuated by a pair of transducers 220A and 220B. The transducers 220A and 220B may be similar to that of the transducers 20A and 20B of FIG. 1 and may convert electrical energy into mechanical energy, causing a shaking motion that induces a flexural wave to act upon the beam 212 via the scatterers 260A and 260B.

Generally, the scatterers 260A and 260B are mounted to the top side 213 of the beam 212 and are separated by a distance d, which may be approximately one-quarter of the wavelength of the frequency of the flexural wave acting upon the beam 212. However, it should be understood that scatterers 260A and 260B and the transducers 220A and 220B may be mounted to the bottom side 215 of the beam 212. Further still, it may also be possible that one scatterer and associated transducer may be mounted to the top side 213, while the other scatterer and associated transducer may be mounted to the bottom side 215. Again, like the other examples, the separation distance d remains the same regardless of the configuration.

Figure 8:
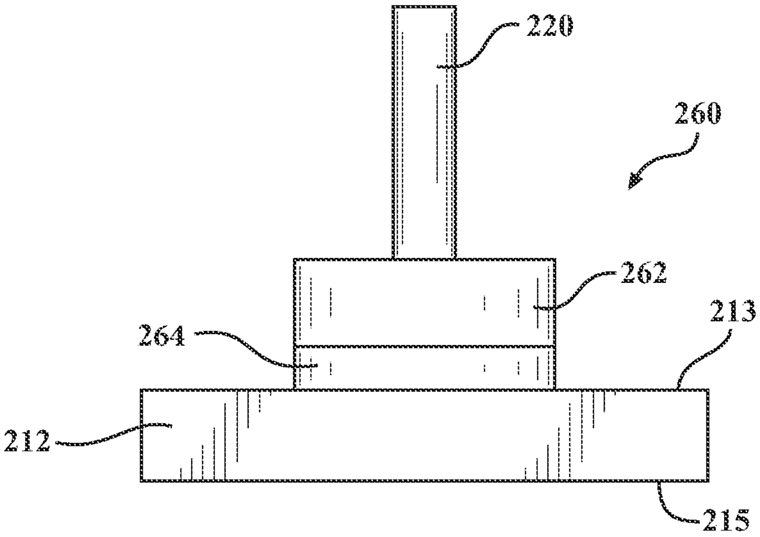
FIG. 8 illustrates a more detailed view of the scatterer utilized in the system of FIG. 7.

A more detailed view of the scatterer 260, which may be similar to the scatterers 260A and 260B, is shown in FIG. 8. Here, the scatterer 260 includes a solid member 262 and a flexible member 264. Generally, the solid member 262 acts as a mass in a mass-spring-damper system and may be made of a rigid material, such as steel, iron, aluminum, ceramics, plastics, etc. However, the solid member 262 may be made of any suitable material that allows the solid member 262 to act as a mass in a mass-spring-damper system.

As to the flexible member 264, the flexible member 264 acts as a spring and damper in a mass-spring-damper system and may be made of a flexible material, such as rubber and soft plastics, such as thermoplastic elastomers, and/or thermoplastic polyurethane. However, the flexible member may be made of any suitable material that allows the flexible member 264 to act as a spring and damper in a mass-spring-damper system.

The solid member 262 may be attached to the flexible member 264 using adhesives. However, the solid member 262 may be attached to the flexible member 264 using a number of different methodologies, such as press-fitting, over-molding, crimping, and/or using retainers, such as screws. The flexible member 264 may be attached to the beam 212 using similar methodologies, such as adhesives, press-fitting, over-molding, crimping, and/or using retainers, such as screws. When scatterer 260 is attached to the beam 212, the flexible member 264 is located between the beam 212 and the solid member 262.

The scatterer 260 may have a resonant frequency substantially similar to the resonant frequency of the flexural wave acting upon the beam 212. Since the scatterer 260 is a spring-mass-damper system, the lumped mass M of the solid member 262 may be represented as $M=\rho A h_1$, wherein $\rho$ is the density of the material that makes up the solid member 262, A is the cross-sectional area of the scatterer 260 is (in particular, the cross-sectional area of the solid member 262), and $h_1$ is the height of the solid member 262. Since the mass of the flexible member 264 may be negligible, the mass of the solid member 262 could be taken as the mass of the scatterer 260.

The lumped stiffness of the scatterer 260 may be represented as $\kappa = EA/(\beta h_2)$, where E is the Young's modulus of the material that makes up the flexible member 264, A is the cross-sectional area of the scatterer 260 (in particular, the cross-sectional area of the flexible member 264), and $h_2$ is the height of the flexible member 264. The damping property C of the material that makes up the flexible member 264 comes from the viscous damping in the material, which can be modeled as the imaginary part of Young's modulus.

It should be understood that the overall shape of the scatterer 260 can vary from application to application. For example, FIG. 7 illustrates that the scatterers 260A and 260B are substantially cylindrical. However, the scatterer 260 can take other shapes as well.

The transducer 220 may be in contact with the solid member 262, and when actuated, the transducer 220 may cause the solid member 262 to move in an up-and-down motion which causes a flexural wave to act upon the beam 212.

Returning to FIG. 7, when the transducers 220A and 220B cause the solid members of the scatterers 260A and 260B to move in an up-and-down motion, flexural waves are created that act upon the beam 212. Generally, when the transducers 220A and 220B are shaking the solid members of the scatterers 260A and 260B at the same frequency with no phase difference, flexural waves are radiated in opposite directions, indicated by the arrows 230 and 232. However, when the scatterers 260A and 260B are separated from each other by the distance d being defined, in this example, as one-quarter of the wavelength of the frequency of the flexural waves acting upon the beam 212 and the transducers 220A and 220B are shaking the solid members of the scatterers 260A and 260B at the same frequency with a phase difference of +/−90 degrees, flexural waves can be substantially directed in one direction or the other.

Figure 9:
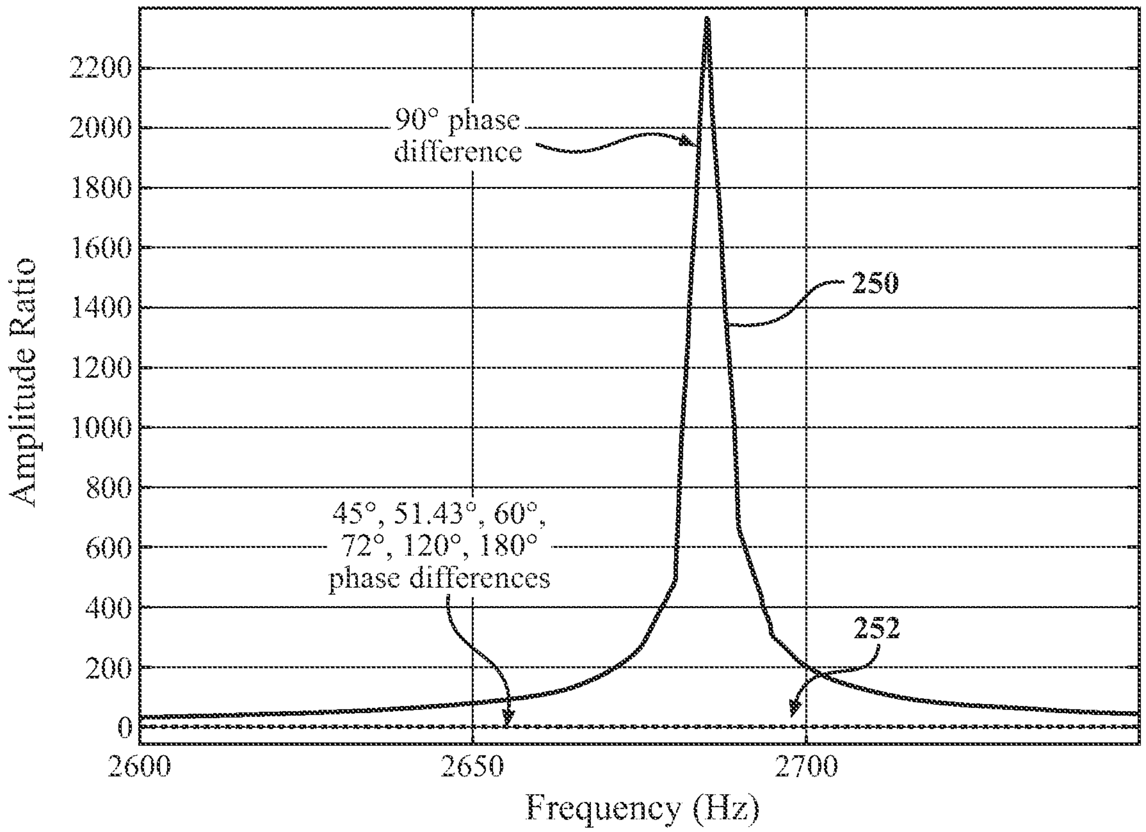
FIG. 9 illustrates the results of directing flexural waves utilizing the system of FIG. 7.

For example, FIG. 9 illustrates the amplitude ratio 250 of the system 200 of FIG. 7 when there is a 90 degrees phase difference between the actuation of the scatterers 260A and 260B. In this example, the beam 212 has a width $$w_b \frac{1}{\sqrt{2}}$$

of the wavelength of the flexural wave acting on the beam 212. The frequency of the flexural wave acting upon the beam 212 is approximately 2685 Hz. Here, the amplitude ratio 250 peaks at approximately a 90 degrees phase difference. The amplitude ratios of other phase differences, such as 45 degrees, 51.43 degrees, 60 degrees, 72 degrees, and 120 degrees are shown by the amplitude ratios 252, which are significantly lower than the amplitude ratio 250.

As such, flexural waves can be directed in one direction or the other by adjusting the phase difference of the actuation of the scatterers 260A and 260B by +/−90 degrees. Therefore, if the phase difference is +90 degrees, the amplitude of the flexural waves may be significantly higher in the direction indicated by the arrow 230 and lower in the direction indicated by the arrow 232. Conversely, if the phase difference is −90 degrees, the amplitude of the flexural waves may be significantly higher in the direction indicated by the arrow 232 and lower in the direction indicated by the arrow 230.

The preceding description is illustrative and does not intend to limit the disclosure, application, or use. The phrase at least one of A, B, and C should be construed to mean a logical (A or B or C), using a non-exclusive logical "or." Disclosure of ranges includes disclosure of all ranges and subdivided ranges within the entire range.

The headings (such as "Background" and "Summary") and sub-headings used herein are intended only for the general organization of topics within the present disclosure and are not intended to limit the disclosure of the technology or any aspect thereof. The recitation of multiple embodiments with stated features is not intended to exclude other embodiments with additional features or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in various forms. Therefore, while this disclosure includes particular examples, the true scope of the disclosure should not be so limited since other modifications will become apparent to the skilled practitioner upon a study of the specification and the following claims. Reference herein to one aspect or various aspects means that a particular feature, structure, or characteristic described in connection with an embodiment or particular system is included in at least one embodiment or aspect. The appearances of the phrase "in one aspect" (or variations thereof) are not necessarily referred to the same aspect or embodiment.

The foregoing description of the embodiments has been provided for purposes of illustration and description. It is not intended to be exhaustive or to limit the disclosure. Individual elements or features of a particular embodiment are generally not limited to that particular embodiment but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A system comprising:

a beam;

a pair of scatterers disposed on the beam and configured to induce a flexural wave on the beam when actuated at a frequency;

wherein the system is configured to direct a direction of travel of the flexural wave acting on the beam based on at least one of a width of the beam, a distance between the scatterers forming the pair of scatterers, and a phase difference between an actuation of the pair of scatterers; and wherein the phase difference between the actuation of the pair of scatterers is such that one of the scatterers forming the pair of scatterers is actuated at a 90-degree phase difference from the other.

2. The system of claim 1, wherein the flexural wave travels in a first direction along a length of the beam when the phase difference between the actuation of the pair of scatterers is −90 degrees and travels in a second direction along the length of the beam when the phase difference between the actuation of the pair of scatterers is +90 degrees.

3. The system of claim 2, wherein the first and second directions are substantially opposite directions.

4. The system of claim 1, wherein the pair of scatterers are disposed along a length of the beam.

5. The system of claim 1, wherein the distance between the scatterers forming the pair of scatterers is approximately one-quarter of a wavelength of the flexural wave.

6. The system of claim 1, wherein a width of the beam is approximately $$\frac{1}{\sqrt{2}}$$

of a wavelength of the flexural wave acting on the beam.

7. The system of claim 1, wherein at least one of the scatterers forming the pair of scatterers comprises:

a pair of supports;

a flexible material extending between the pair of supports; and a mass connected to the flexible material.

8. The system of claim 7, wherein at least one of the scatterers forming the pair of scatterers further comprises a rigid cross bar extending between the supports forming the pair of supports.

9. The system of claim 1, wherein at least one of the scatterers forming the pair of scatterers comprises:

a solid member acting as a mass; and a flexible member attached to a side of the solid member, the flexible member acting as a spring and damper.

* * * * *